United States Patent Office 2,847,387
Patented Aug. 12, 1958

2,847,387
ALUMINA COMPOSITIONS

Everet F. Smith, Des Plaines, Ill., assignor to Standard Oil Company, Chicago, Ill., a corporation of Indiana No Drawing. Application December 30, 1954
Serial No. 478,935

6 Claims. (Cl. 252—466)

This invention relates to alumina and to catalytic compositions and processes based thereon. More particularly, it relates to hydrous aluminas and to an improved method for the preparation thereof.

Alumina is one of the most commonly employed bases or supporting materials for catalytically active substances, and numerous methods have been developed for its preparation. One convenient method involves the reaction of amalgamated aluminum with water, as described by Lewellyn Heard in U. S. Reissue Patent 22,196, issued October 6, 1942. The said reaction yields a product which is either a fluid, transparent alumina hydrosol or an aqueous slurry of alumina monohydrate, $Al_2O_3 \cdot H_2O$, depending upon whether a peptizing agent such as a weak organic acid is respectively present within the reaction mixture (as in the Heard technique) or absent therefrom. In either event, solid, hydrous alumina is conveniently prepared from the reaction product by gelling and/or drying and calcining at elevated temperature.

Alumina monohydrate or hydrosol prepared according to the Heard technique always contains a small proportion of entrained mercury, generally of the order of 5 to 50 parts per million. When such materials are subjected to drying and calcining, the mercury is volatilized, and the resulting vapors, escaping from the calcining zone, give rise to a serious health hazard, requiring the exercise of extreme measures to avoid harm to operating personnel. An object of my invention is to eliminate the dangers and difficulties associated with the presence of mercury in alumina monohydrate and alumina hydrosols. Another object is to prepare alumina compositions in a more convenient and expeditious manner. A further object is to prepare alumina compositions of improved physical and chemical properties. Another object is to prepare alumina-based catalysts having improved catalytic properties. Another object is to improve the catalytic conversion of hydrocarbons, more particularly the hydroforming of petroleum naphthas in the presence of alumina-supported platinum catalysts. These and other objects of my invention will be apparent from the following description thereof.

I have discovered that the conversion of metallic aluminum into hydrous alumina can readily be effected by digesting aluminum with water in the presence of gallium. The resulting alumina hydrosol or alumina monohydrate, being free from mercury, does not give rise to the mercury-vapor hazard during drying and calcining, and no corresponding hazard results from entrained gallium, since gallium boils at around 3600° F., compared with only 675° F. for mercury.

In one embodiment of my invention, metallic aluminum in any convenient form such as pellets, granules, turnings, or the like is introduced into a closed reaction vessel having a perforated false bottom, a vented top, and means for blanketing the free space therein with hydrogen to prevent access of air. The aluminum is preconditioned by pumping into the reaction vessel a dilute aqueous solution of gallium chloride, bromide, sulfate, nitrate, iodide, or other water-soluble gallium salt and allowing the mixture to stand for around 5 minutes at ordinary temperatures, at the end of which time a surface coating of gallium or gallium-aluminum alloy will ordinarily have been deposited by exchange with the aluminum. The treating solution is then drawn off, residual salts are washed from the aluminum with water, and the reactor is filled to the desired level with an aqueous solution containing from about 1 to 5 per cent of acetic acid. The reaction mixture is heated to a temperature above about 140° F. to induce vigorous reaction, temperatures between about 150 and 190° F. being highly satisfactory. The reaction is quite exothermic, and the temperature is easily maintained within the chosen range. The aluminum is converted by the reaction into a fluid, practically transparent alumina hydrosol, the reaction being ordinarily completed in less than about 24 hours—e. g., around 6 to 12 hours in most cases. The reaction mixture is filtered, centrifuged, settled and decanted, or otherwise treated to remove residual gallium, aluminum, and/or solid alumina hydrates. The purified hydrosol can be gelled if desired by adding ammonium hydroxide, ammonium carbonate, a weak non-contaminating acid, or other non-contaminating electrolyte. The hydrosol or gel is finally dried and calcined according to well-known procedures to produce hydrous alumina in solid form. If desired, catalytic metals or metal compounds can be incorporated in the hydrosol prior to gelling, or in the gel prior to drying and calcining.

In a modification of the above embodiment of my invention, the acetic acid is omitted from the reaction mixture and the temperature is maintained preferably near the boiling point. As a result, the aluminum is converted into a creamy, filterable slurry of alumina monohydrate. The slurry can be filtered, centrifuged, or settled and decanted, and the separated alumina monohydrate can be dried and calcined, yielding solid, hydrous alumina. Catalytic adjuvants can be added at any desired stage of this procedure.

In another embodiment, substantially pure (99.95 percent or over) aluminum metal is reacted with an aqueous solution containing 1 to 5 percent acetic acid, 1 to 2 percent gallium acetate, and chloroplatinic acid in an amount equal to between about 0.01 and 1 percent, preferably 0.1 and 1 percent, of the aluminum, calculated as dry $Al_2O_3$. The resulting platinum-alumina hydrosol is separated from the gallium and unreacted aluminum, and is commingled with a promoting adjuvant such as a silica hydrosol or preferably a halogen or hydrogen halide. Halogen and hydrogen halide are suitable in proportions between about 0.1 and 8 percent of halogen based upon dry $Al_2O_3$, but fluorine and hydrogen fluoride are preferred, in proportions between about 0.1 and 3 percent F. The mixture of hydrosol and promoter is gelled, dried, and calcined, and a catalyst is obtained of exceptionally desirable properties in the hydroforming of hydrocarbons.

Numerous modifications in the various steps of my process will be apparent to those skilled in the art. For example, the activation of the aluminum metal with gallium can be effected by contacting the aluminum with metallic gallium, or with a dispersion of gallium sub-oxide, sesquioxide, hydroxide, or the like in a dilute aqueous solution of a weak organic acid, yielding a gallium-aluminum couple or alloy. The gallium treatment can be carried out in a separate vessel, and the treated aluminum can be transferred continuously or intermittently into the reaction vessel. The gallium treatment and the reaction with water need not be effected as separate operations, but can be conveniently carried out together, for example, by reacting metallic aluminum at elevated temperature with an aqueous solution of a sufficient quantity of a gallium salt in the presence or absence of a weak acid. The gallium treatment and/or the subsequent reaction of the gallium-activated aluminum with water can be carried out under conditions of reduced or elevated pressure, so long as the temperature of the reaction mixture is maintained at a sufficiently high level to effect the desired reaction. A portion of the reaction menstruum can be continuously or intermittently withdrawn and recirculated to agitate the mixture and to prevent settling. The reaction product can be freed from gallium by selective settling and/or by contacting with a fresh quantity of gallium-treated aluminum, the latter technique being especially useful in connection with the purification of alumina monohydrate slurries. Other modifications will occur to those skilled in the art.

In general, it can be said that the gallium activation of aluminum according to my invention can be carried out by contacting the aluminum with metallic gallium or with any gallium compound capable of liberating metallic gallium in contact with aluminum under the conditions employed. Effective pretreatment can be achieved with quite low proportions of gallium—e. g., between about 0.1 and 2 percent by weight, based on aluminum, preferably between about 0.5 and 1 percent.

In the preparation of an alumina hydrosol according to my invention, the digestion is carried out with an aqueous solution of a weak acid, preferably a weak organic acid having an ionization constant at 20° C. less than about $10^{-3}$. Suitable acids include formic acid, acetic acid, propionic acid, succinic acid, malic acid, chloroacetic acid, oxalic acid, tartaric acid, and the like. I ordinarily employ acids in a concentration between about 0.5 and 5 percent by weight, preferably around 2 percent by weight. The treating solution may optionally contain an added organic solvent, such as methanol, ethanol, acetone, acetaldehyde, or the like, as taught in Heard U. S. Patent 2,696,474 (December 7, 1954).

Alumina hydrosols prepared according to my invention can be gelled by the simple technique of drying, or by addition of an electrolyte such as ammonium hydroxide, ammonium chloride, ammonium acetate, ammonium oxalate, ammonium tartrate, ammonium carbonate, or the like, preferably in a sufficient quantity to produce a pH between about 5 and 8.5. Under these conditions, a vibrant ultragel is produced, retaining all of the water present in the hydrosol.

Alumina gels, alumina ultragels, or alumina monohydrate obtained according to my invention is preferably dried at least in part at a temperature between about 200 and 400° F. for a period between about 4 and 24 hours. The resulting cake is then calcined at a temperature between about 800 and 1200° F. for around 2 to 8 hours or more.

A wide variety of catalytic substances can be incorporated in my alumina composition at any stage in its manufacture. Among such substances are manganese, iron, cobalt, nickel, copper, silver, palladium, platinum, tungsten, vanadium, zirconium, molybdenum, and others, as well as oxides, sulfides, and other compounds thereof, and mixtures of such substances. These materials may conveniently be added to the undried alumina in the form of soluble salts of weak organic acids, soluble halides, nitrates, aluminates, soluble oxides, ammonium or other quasimetal salts of acids containing the catalytic substance, or the like, preferably in aqueous solution. As illustrative examples, aqueous solutions can be employed containing ammonium molybdate, chloroplatinic acid, platinum tetrachloride, nickel formate, cobalt acetate, ammonium chromate, ammonium vanadate, and the like. The ammonium salts are especially desirable, since such salts are decomposed during the calcining operation, the ammonia being liberated and driven off as a gas, and the desired catalytic metal being deposited as the oxide thereof in the alumina. Alternatively, the desired catalytic substances can be added to the alumina after the drying and/or calcining steps by impregnation, using an aqueous solution, or by mechanical admixture.

My alumina or catalytic mixtures based thereon can be prepared in any desired mechanical form according to the specific process for which it is intended. Either before or after calcination it can be broken into lumps or granules, or it can be ground into a fine powder, suitable for use for example in the suspensoid or fluidized-solids processes. Alternatively, the alumina composition can be formed into pills, pellets, or other suitable shapes, preferably prior to the calcination step. In this case, the partially dried material is ground to a powder, preferably small enough to pass through a 30-mesh screen, a suitable lubricant is added, such as stearic acid, rosin, hydrogenated coconut oil, graphite, or the like, and the mixture is shaped by extrusion, compression in a pilling machine, or otherwise according to methods well known in the art. Pills having dimensions ranging from about ⅛" x ⅛" to ½" x ½" are highly satisfactory for most purposes. The shaped masses are then ordinarily calcined, as set forth above.

The following specific example will more fully illustrate my invention:

Into a 5-liter flask were placed 2,230 milliliters of distilled water, 43 milliliters of acetic acid, 63.6 grams of aluminum pellets, and 0.6 gram of metallic gallium, and the mixture was stirred and heated to 160° F. The initial reaction rate was very great, of the order of twice the rate observed in a conventional preparation using mercuric oxide to amalgamate and activate the aluminum. When the reaction reached 90 percent of completion, based on the conversion of aluminum, the rate had dropped sharply, and the run was terminated. The alumina hydrosol, on being separated from the residual aluminum and gallium, was found to be of normal viscosity and color.

The completed hydrosol was used to prepare a platinum-alumina catalyst according to the following procedure. A platinum solution was prepared by dissolving 1.52 grams of chloroplatinic acid in 600 milliliters of distilled water, then adding 1 milliliter of aqueous 23 percent ammonium sulfide solution. The entire platinum solution was added to 1,803 grams of the alumina hydrosol, prepared as described above, equivalent to 101 grams of $Al_2O_3$. The resulting mixture was gelled by adding 120 milliliters of aqueous 10 percent ammonia. The gel was dried overnight at 220° F., then calcined 3 hours at 950° F. The calcined cake was ground to pass 30 mesh, lubricated with 4 percent of Sterotex (a hydrogenated coconut oil), formed into ⅛" pellets, and calcined in air for 6 hours at 1100° F.

The completed platinum-alumina catalyst, containing 0.6 percent by weight of platinum, was subjected to a screening test to measure its activity as a hydroforming catalyst. The test was carried out on a 90 percent distillate fraction of a Mid-Continent virgin naphtha, the said fraction having an index of refraction ($n_D^{20}$) of 1.4179. The charging stock was vaporized in a stream of hydrogen and passed at one atmosphere through a carefully measured portion of the catalyst, maintained at the temperature (833° F.) of boiling sulfur. The product corresponding to a unit volume of feed was collected, measured, and tested for index of refraction as a measure of the aromatizing power of the catalyst. For comparison, an identical test was run on an 0.6 percent platinum-alumina catalyst prepared from an alumina hydrosol which had been made by the Heard technique (U. S. Reissue Patent 22,196 referred to above), employing amalgamated aluminum. The results of duplicate tests on each of the catalysts were as follows:

| Hydrosol Preparation | Product Index, $n_D^{20}$ | Product Yield, Volume Percent |
|---|---|---|
| Gallium | 1.4518 | 79.5 |
| Gallium | 1.4490 | 80.5 |
| Mercury | 1.4496 | 80 |
| Mercury | 1.4528 | 78 |

My improved alumina and catalysts compositions based thereon are broadly useful in hydrocarbon-conversion reactions, the application of choice depending upon the specific catalytic adjuvant incorporated therein. Specifically, my catalysts are useful for reforming, isomerization, hydrogenation, hydrocracking, dehydrogenation, oxidation, polymerization, condensation, and other reactions known in the art, as taught for example in Heard Reissue Patent 22,196 and in Haensel Patents 2,479,109 and 2,479,110 (August 16, 1949). The required processing conditions depend upon the specific reactions and the charging stocks involved, and can be determined from the teachings of the prior art.

My improved alumina is especially advantageous as a supporting material for platinum catalysts for use in the reforming of hydrocarbons. Such catalysts, ordinarily containing between about 0.1 and 1 percent by weight of platinum, based on dry $Al_2O_3$, are especially effective in the treatment of feed stocks consisting essentially of a virgin naphtha, a cracked naphtha, or a mixture thereof, boiling within the range of about 100 to 425° F., and preferably within the range of about 180 to 375° F. In carrying out the hydroforming process, the charging stock is vaporized and contacted with the catalyst at a temperature within the range of about 800 to 1000° F., the average temperature throughout the catalyst bed being maintained within the range of about 875 to 975° F., preferably around 900 to 950° F. The process is operated at a pressure within the range of 100 to 1,000 pounds per square inch, preferably from about 200 to 500 pounds per square inch, and at a liquid hourly velocity between about 0.5 and 5, preferably between about 1 and 2. Hydrogen is included within the reaction zone, ordinarily by recycle, in the range of about 2 to 8 moles of hydrogen per mole of feed, preferably between about 3 and 6 moles per mole.

My new catalysts can be employed in any of the conventional types of equipment known to the art. I may, for example, employ the catalysts in the form of pills, pellets, granules, broken fragments, or various special shapes, disposed as a fixed bed within a reaction zone, and the charging stock may be passed therethrough in the liquid, vapor, or mixed phase, and in either upward or downward flow. Alternatively, I may prepare the catalyst in a suitable form for use in moving beds, in which the charging stock and catalyst are preferably passed in counter-current flow; or in fluidized-solid processes, in which the charging stock is passed upward through a turbulent bed of finely divided catalyst; or in the suspensoid process, in which the catalyst is slurried in the charging stock and the resulting mixture is conveyed into the reaction zone. The reaction products from any of the foregoing processes are separated from the catalyst, vented to atmospheric pressure, and fractionated to recover the various components thereof. The hydrogen and unconverted materials are recycled as desired.

While I have described my invention with reference to certain specific embodiments thereof, it is to be understood that such embodiments are illustrative only and not by way of limitation. My invention is broadly useful and operative as detailed hereinabove, and numerous modifications and equivalents will be apparent from the disclosure to those skilled in the art.

In accordance with the foregoing description, I claim as my invention:

1. A method for preparing alumina from aluminum which comprises reacting aluminum metal with water in the presence of about 0.1 to 2 percent by weight of gallium as catalyst, at a temperature above about 140° F. for a time sufficient to form hydrous alumina.

2. The method of claim 1 wherein said water contains between about 0.5 and 5 percent by weight of an organic acid having an ionization constant less than about $10^{-3}$ at 20° C.

3. The method of claim 1 including the steps, after formation of said hydrous alumina, of separating said hydrous alumina from the resulting reaction mixture, drying and calcining.

4. The method of claim 1 including the step, after formation of said hydrous alumina, of incorporating platinum therein.

5. A method for preparing alumina from aluminum which comprises reacting aluminum metal with water in the presence of about 0.1 to 2 percent by weight of gallium as catalyst at a temperature between about 150° and 190° F. for a time sufficient to form hydrous alumina.

6. A method for preparing alumina from aluminum which comprises reacting aluminum metal with water acidulated with a weak organic acid in the presence of about 0.1 to 2 percent by weight of gallium as catalyst at a temperature between about 150° and 190° F. for a time sufficient to form alumina hydrosol, separating said alumina hydrosol from residual solids, gelling said hydrosol, and drying and calcining the resulting gel.

References Cited in the file of this patent

UNITED STATES PATENTS

| 2,274,634 | Heard | Mar. 3, 1942 |
| 2,478,916 | Haensel | Aug. 16, 1949 |
| 2,598,777 | Frary | June 3, 1952 |